United States Patent [19]
Brigham, Sr.

[11] Patent Number: 5,269,886
[45] Date of Patent: Dec. 14, 1993

[54] GLYCOL STABILIZER

[75] Inventor: Leslie E. Brigham, Sr., Edmond, Okla.

[73] Assignee: Alberta G. Brigham, Edmond, Okla.

[21] Appl. No.: 933,123

[22] Filed: Aug. 21, 1992

[51] Int. Cl.⁵ .................................................. B01D 3/02
[52] U.S. Cl. ............................ 202/176; 202/202; 202/256; 203/2; 203/18; 55/228; 95/194
[58] Field of Search ............ 202/176, 197, 256, 160, 202/205, 202; 159/31, DIG. 10; 203/40, 18, 2, 21; 55/32, 171, 175, 172, 174, 176, 177; 210/DIG. 5, DIG. 6

[56] References Cited

U.S. PATENT DOCUMENTS

| | | | |
|---|---|---|---|
| 3,626,672 | 12/1971 | Burbidge | 159/31 |
| 3,841,382 | 10/1974 | Gravis, III et al. | 55/32 |
| 3,867,112 | 2/1975 | Honerkamp et al. | 55/32 |
| 3,914,115 | 10/1975 | Parker, Sr. | 55/32 |
| 4,070,231 | 1/1978 | Alleman | 55/32 |
| 4,198,214 | 4/1980 | Heath | 55/175 |
| 4,280,867 | 7/1981 | Hodgson | 159/47 |
| 4,314,891 | 2/1982 | Knobel | 202/176 |
| 4,332,643 | 6/1982 | Reid | 202/176 |
| 4,375,977 | 3/1983 | Honerkamp et al. | 55/234 |
| 4,432,779 | 2/1984 | Honerkamp et al. | 55/233 |
| 4,549,432 | 10/1985 | Bland et al. | 55/177 |
| 4,674,446 | 6/1987 | Padilla, Sr. | 55/174 |
| 4,686,938 | 8/1987 | Rhodes | 55/32 |

Primary Examiner—Virginia Manoharan
Attorney, Agent, or Firm—Robert K. Rhea

[57] ABSTRACT

In a gas dehydration system utilizing glycol in which a condensate skimming reflux column mounted on a gas fuel burner and heat exchanger unit separates and skims natural gas condensate off glycol in a settling tank-type reservoir, a fluid scrubber and separator interposed in series in a heat exchanger to reflux column wet glycol return line collects and transfers gas to the fuel burner.

3 Claims, 2 Drawing Sheets

GLYCOL STABILIZER

BACKGROUND OF THE INVENTION

1. Field of the invention.

This invention relates to a glycol dehydration system which reconditions glycol for reuse in drying gas.

2. Description of the prior art.

Prior systems for dehydrating natural gas streams usually comprise a contacting device, a dehydrating liquid agent reconcentrating device, and a pump for circulating the dehydrating agent.

U.S. Pat. No. 4,280,867, issued Jul. 28, 1981, to Hodgson, for glycol regeneration is believed a good example of the state of the art which utilizes the above named components and in addition exposes the hot partially dehydrated desiccant to a flow of dry inert fuel gas and a partial vacuum in order to remove additional water from the desiccant.

Most glycol dehydration systems vent natural gas vapor to the atmosphere, thus polluting the environment. The structure of this invention is interposed in the return line between the reconcentrator-heat-exchanger and the reflux still column for removing gas vapor from the wet glycol by collecting the gas and utilizing it as fuel in the burner of the glycol reboiler.

SUMMARY OF THE INVENTION

A scrubber/separator receives the wet or rich glycol transferred from a glycol reconcentrator heat exchange unit to the reboiler. The scrubber/separator separates natural gas from the glycol in which the latter gravitates to the bottom of the separator for periodic discharge to a still column above a glycol reboiler. Gas in the separator/scrubber flows to a float equipped settling tank or accumulator which in turn supplies gas to the glycol system reboiler unit.

The principal object of this invention is to scrub entrained natural gas from glycol in a glycol reconcentrating unit and utilize the otherwise wasted gas as a supplemental fuel source for the glycol reboiler unit.

Figure 1:
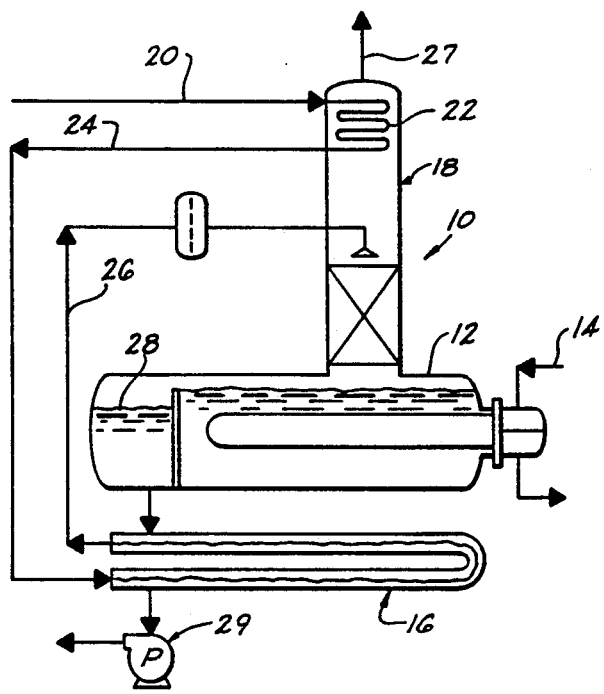
FIG. 1 is a system diagram of a prior art liquid desiccant reconcentrating system.

Referring first to FIG. 1, the reference numeral 10 indicates a liquid desiccant reconditioning system comprising a glycol reboiler 12 having a burner supplied with a fuel gas source 14 including a heat exchanger 16 and a reflux column 18 mounted on the reboiler 12.

Wet glycol from a moisture absorber, not shown, enters the reflux column 18 through a line 20, flows through condensing coils 22 and to the heat exchanger 16 through a coil outlet conduit 24. Glycol from the heat exchanger 16 flows through another conduit to the column 18 above the reboiler 12. Water vaporized by the heat of the reboiler exits the column 18 through a top vent 27 with some natural gas. Hot glycol flows, by gravity, from the reboiler surge tank 28 through the heat exchanger 16 and is pumped by a glycol pump 29 to the moisture absorber as dry or reconcentrated glycol which forms a liquid desiccant in most natural gas dehydration systems.

The above description is substantially conventional with a glycol reconcentrating or drying of liquid desiccants and forms no part of the present invention other than to set forth the combination with which the present invention is used.

Figure 2:
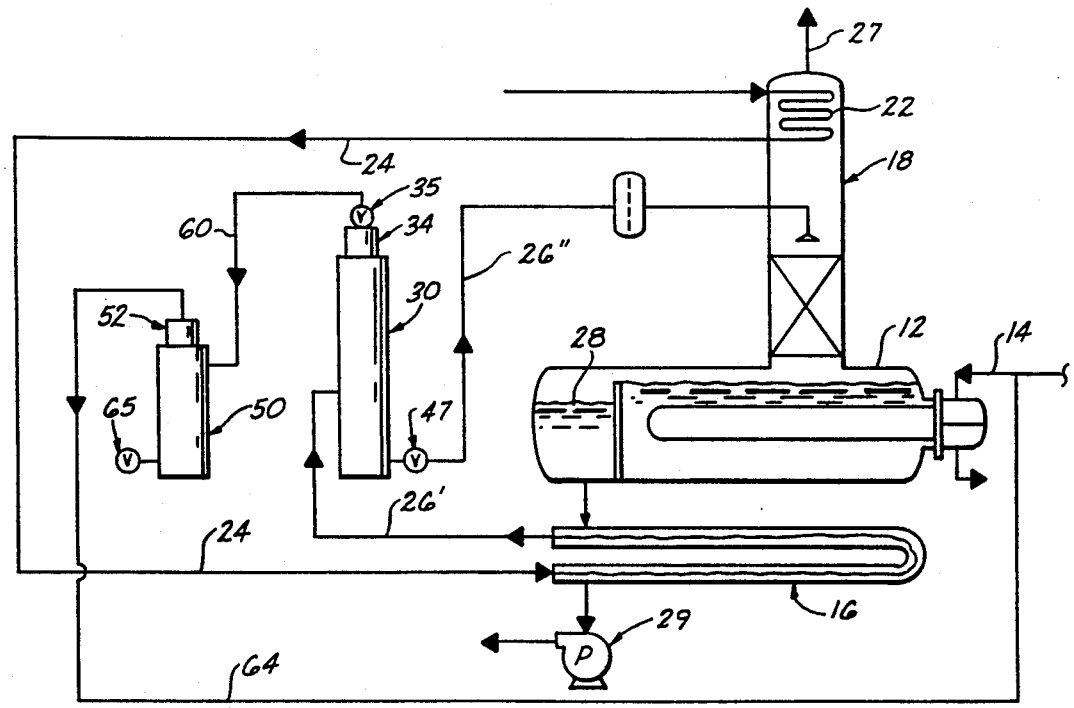
FIG. 2 is a mechanical diagram illustrating scrubber/separator and gas accumulator units interposed between a reconcentrator and still column of a liquid desiccant reconditioning system; and, FIG. 3 is a vertical cross-sectional view of the scrubber/separator and gas accumulator units of this invention.
Figure 3:
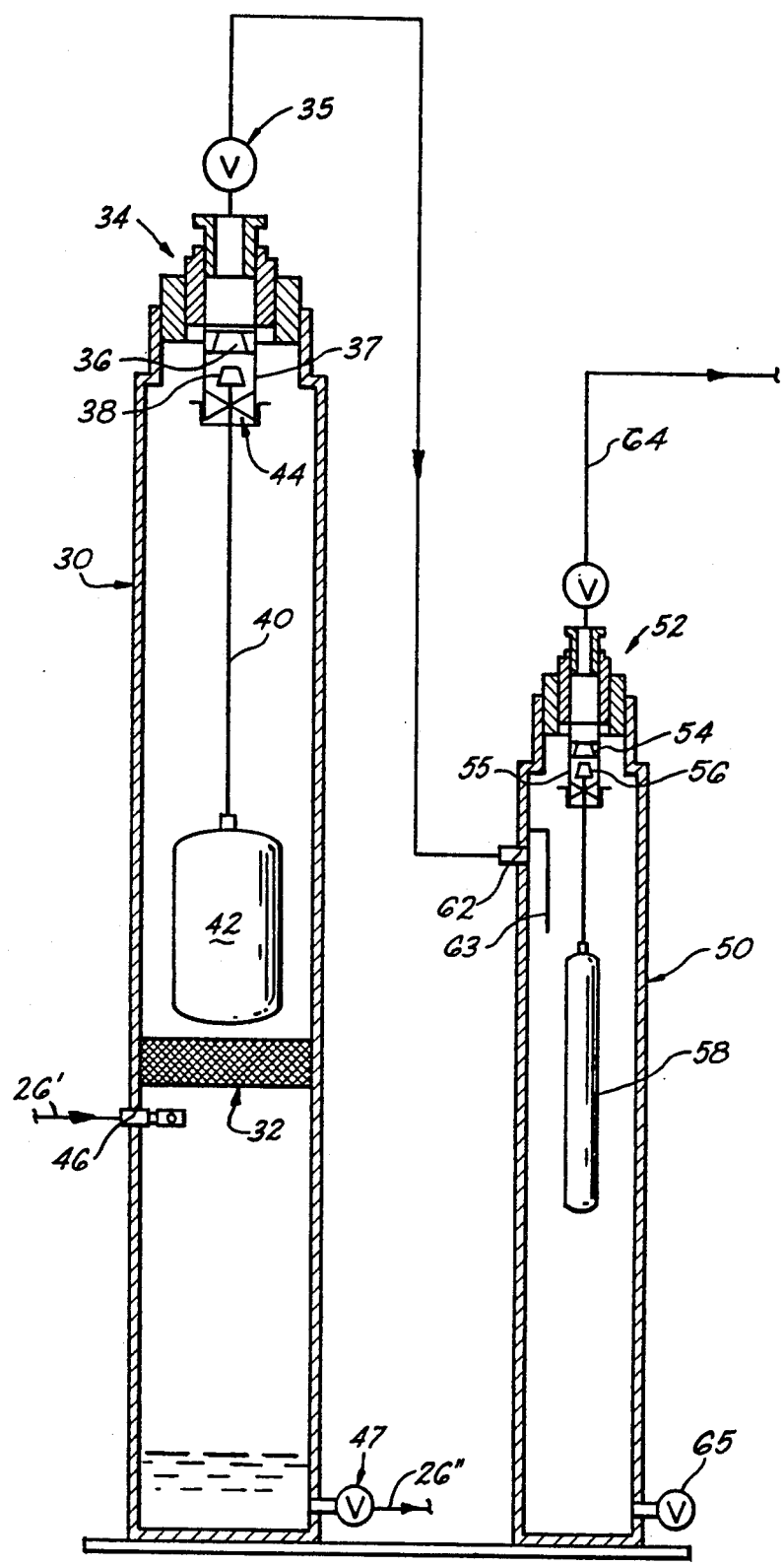

Referring to FIGS. 2 and 3, a separator/scrubber tank 30 is interposed in series in the glycol return conduit 26. The scrubber/separator 30 is an elongated upright generally cylindrical tank having a transverse partition 32 intermediate its ends formed from mesh screen material of selected size and having a float valve means 34 at its upper open end portion. A pressure regulator valve 35 preferably set at 18–20 psig closes the outlet of the valve means 34. The float valve means 34 includes a valve seat 36 in a depending vertical tube 37 for sealing with a valve 38 on the upper end of an elongated stem 40 supporting a float 42 above the partition 32. The valve 38 is maintained in the supporting tube 37 by a cage 44.

The wall of the separator 30 is provided with an inlet opening 46 disposed below the wire mesh partition 32. The separator tank wall is also provided with a drain outlet normally closed by a back pressure regulator valve means 47 preferably set at 20–25 psig for the reason presently explained.

The glycol return conduit 26 is parted intermediate its ends and its heat exchanger end portion 26' is connected with the separator tank inlet 46. The still column end portion of the conduit 26" is connected with the separator drain valve means 47, for transferring glycol collecting in the separator to the still column 18, as more fully explained hereinbelow.

A gas accumulator 50 similarly elongated generally cylindrical upright, which may be diametrically smaller than the separator tank 30, receives natural gas from the separator 30. The gas accumulator 50 is similarly provided with float valve means 52 which includes a valve seat 54 for seating a valve 56 and closing the float valve means 52. The valve seat 54 is similarly formed on the wall of a tube 55 and the valve 56 is connected with a float 58. A gas transfer tubular line 60 connects the regulator valve 35 to an inlet 62 in the wall of the accumulator 50. A baffle 63 within the gas accumulator 50 diverts gas from the separator tank downwardly to allow any glycol or water to settle, by gravity, in the accumulator 50, which is also provided with a manually operated drain valve 65. The accumulator float valve means 52 is connected with the reboiler burner fuel line 14 by a tubular line 64.

Operation

In operation gas rich glycol enters the tank 30 inlet 46 from the heat exchanger line 26'. The glycol settles in the scrubber tank 30 by coalescing on the screen partition 32 and falling to the bottom while the gas collects in the upper portion of the tank and passes through the float valve means 34, regulator 35, the line 60 and the inlet 62 of the accumulator 50. Gas in the accumulator 50 similarly passes through its valve means 52 and the line 64 to the reboiler fuel source line 14.

When the separator/scrubber tank 30 collects sufficient glycol to lift the float 42 and close the valve 38 with its seat 36 and gas pressure in the tank 30 reaches the back pressure valve 47 lower limit it opens to drain the glycol through the conduit 26" to the reflux or still column 18. When the glycol has been removed and pressure decreased in the separator 30 its valve 38 opens, the back pressure valve 47 closes and the cycle repeats.

The accumulator 50 is periodically drained. If fluid in the accumulator raises the float 58 to close its valve 56 with its seat 54 fuel gas to the reboiler burner is supplied from its existing regulator in the fuel gas line 14.

Obviously the invention is susceptible to changes or alterations without defeating its practicability. Therefore, I do not wish to be confined to the preferred embodiment shown in the drawings and described herein.

I claim:

1. In a glycol reconcentrating apparatus including a reboiler having a fuel gas burner, a reflux tower including a still column receiving vapors from the reboiler, a condensing coil within the reflux tower, a glycol reconcentrating heat exchanger and fluid conduits connecting the heat exchanger with the still column, the improvement comprising:

fluid scrubber and separator means including an elongated upright tank having a top opening, said scrubber and separator means is interposed in the return line of the fluid between the reconcentrating heat exchanger and the still column for removing gas vapor from a wet glycol, said tank having a wall inlet vertically spaced above a wall outlet in series in one said conduit;

partition means in said tank above its wall inlet for coalescing moisture;

fluid pressure responsive valve means for normally closing the tank top opening and said wall outlet;

tubular line means for connecting the tank top opening valve means with the fuel burner;

normally open float valve means including a tube secured to the upper limit of said tank in depending axial alignment with its top opening;

a valve seat in said tube;

a valve for sealing with said seat and closing the top opening; and, a float connected with said valve.

2. The reconcentrating apparatus according to claim 1 and further including:

gas container means including an upright accumulator having a wall inlet and a top opening respectively interposed in said tubular line means.

3. In a glycol reconcentrating apparatus including a reboiler having a fuel gas burner, a reflux tower including a still column receiving vapors from the reboiler, a condensing coil within the reflux tower, a glycol reconcentrating heat exchanger and fluid conduits connecting the heat exchanger with the still column, the improvement comprising:

fluid scrubber and separator means including an elongated upright tank having a top opening, said scrubber and separator means is interposed in the return line of the fluid between the reconcentrating heat exchanger and the still column for removing gas vapor from a wet glycol, said tank having a wall inlet vertically spaced above a wall outlet in series in one said conduit;

partition means in said tank above its wall inlet for coalescing moisture;

fluid pressure responsive valve means for normally closing the tank top opening and said wall outlet;

tubular line means for connecting the tank top opening valve means with the fuel burner;

gas container means including an upright accumulator having a wall inlet and a top aperture respectively interposed in said tubular line means;

normally open float valve means including a tube secured to the upper limit of said tank and said accumulator in depending axial alignment with the tank top opening and the accumulator aperture, respectively;

a valve seat in the respective said tube;

a valve for sealing with the respective said seat and closing the tank top opening and accumulator aperture; and, a float connected with the respective said valve.

* * * * *